(12) United States Patent
Lee

(10) Patent No.: US 11,858,434 B2
(45) Date of Patent: Jan. 2, 2024

(54) ELECTRONIC CONTROL UNIT FOR VEHICLE HAVING FIXING MEMBER FOR COUPLING A COVER PORTION AND A BASE PORTION

(71) Applicant: HYUNDAI MOBIS CO., LTD., Seoul (KR)

(72) Inventor: Sang Gwon Lee, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 265 days.

(21) Appl. No.: 16/893,485

(22) Filed: Jun. 5, 2020

(65) Prior Publication Data

US 2020/0384933 A1    Dec. 10, 2020

(30) Foreign Application Priority Data

Jun. 5, 2019   (KR) .................. 10-2019-0066910
Jun. 5, 2019   (KR) .................. 10-2019-0066911

(51) Int. Cl.
*B60R 16/02*      (2006.01)
*B60R 16/023*     (2006.01)
*H01R 13/506*     (2006.01)

(52) U.S. Cl.
CPC ....... *B60R 16/0239* (2013.01); *H01R 13/506* (2013.01)

(58) Field of Classification Search
CPC .......................... B60R 16/0239; H01R 13/506
See application file for complete search history.

(56) References Cited

U.S. PATENT DOCUMENTS

| | | | | |
|---|---|---|---|---|
| 10,027,100 B1* | 7/2018 | Nakano | .................. | H02G 3/083 |
| 10,584,813 B2* | 3/2020 | Leys | ..................... | F16L 19/005 |
| 10,819,072 B2* | 10/2020 | Suda | .................. | H01R 13/6583 |
| 10,856,428 B2* | 12/2020 | Imaizumi | ............ | B60R 16/0238 |
| 10,938,262 B2* | 3/2021 | Hattori | .................. | H02K 11/33 |
| 11,031,735 B2* | 6/2021 | Tamai | ................ | H01R 13/6474 |
| 11,171,432 B2* | 11/2021 | Parkes | ................. | H01R 12/774 |
| 11,362,493 B2* | 6/2022 | Ikeda | ................... | H01R 9/2408 |
| 2012/0134130 A1* | 5/2012 | Washihira | ........... | B60R 16/0239 361/819 |
| 2014/0020948 A1* | 1/2014 | Kamigaichi | ............. | H02G 3/08 174/535 |
| 2017/0346266 A1* | 11/2017 | Matsui | ..................... | H02G 3/14 |
| 2018/0309279 A1* | 10/2018 | Kakimi | .................. | H02G 3/088 |
| 2019/0132966 A1* | 5/2019 | Mitsui | ..................... | H05K 3/202 |
| 2019/0307001 A1* | 10/2019 | Karszt | ................. | H05K 5/0008 |
| 2019/0368600 A1* | 12/2019 | Sone | ..................... | H05K 5/0069 |
| 2019/0380220 A1* | 12/2019 | Matsuda | ................ | H01R 13/41 |

(Continued)

FOREIGN PATENT DOCUMENTS

JP        6286012 B      2/2018
KR     10-1678808 B     11/2016

*Primary Examiner* — Rockshana D Chowdhury
*Assistant Examiner* — Douglas R Burtner
(74) *Attorney, Agent, or Firm* — H.C. Park & Associates, PLC

(57) ABSTRACT

An electronic control unit for a vehicle includes a base portion of which an upper portion is open, a cover portion covering the upper portion of the base portion and on which a matching connector electrically connected to an electronic element is seated, and a fixing member passing between the base portion and the cover portion and vertically fixedly coupling the matching connector, the cover portion, and the base portion.

13 Claims, 13 Drawing Sheets

(56) References Cited

U.S. PATENT DOCUMENTS

| | | | |
|---|---|---|---|
| 2020/0047695 A1* | 2/2020 | Mori | H05K 5/0017 |
| 2020/0056914 A1* | 2/2020 | Kimura | H01R 13/521 |
| 2020/0119532 A1* | 4/2020 | Imaizumi | H01R 12/58 |
| 2020/0315040 A1* | 10/2020 | Ney | B60R 16/0239 |
| 2020/0323094 A1* | 10/2020 | Katsuse | H05K 7/1427 |
| 2021/0273371 A1* | 9/2021 | Sumida | H01R 13/6272 |
| 2022/0071029 A1* | 3/2022 | Akiba | H05K 5/0056 |
| 2022/0263381 A1* | 8/2022 | Matsuda | H02K 9/227 |

\* cited by examiner

ELECTRONIC CONTROL UNIT FOR VEHICLE HAVING FIXING MEMBER FOR COUPLING A COVER PORTION AND A BASE PORTION

CROSS-REFERENCE TO RELATED APPLICATIONS

This application claims priority to and the benefit of Korean Patent Application No. 10-2019-0066910, filed on Jun. 5, 2019 and Korean Application No. 10-2019-0066911, filed on Jun. 5, 2019, the disclosures of which are incorporated herein by reference in its entirety.

BACKGROUND

Field

Exemplary embodiments of the invention relate generally to an electronic control unit for a vehicle, and more specifically the electronic control unit having a coupling structure configured to effectively fix a housing to prevent a vehicle from being stolen by preventing separation of a connector and the housing.

Discussion of the Background

General starting systems initially start vehicles using a method in which a driver inserts a start key into a starter switch and turns the start key. However, since the start key of the starting system may be easily copied, there is a worry in that the vehicles are easily stolen.

As alternatives, smart key methods are used but, since an intruder may steal a vehicle using a method in which the intruder breaks a vehicle door, intrudes into a vehicle, and separates and replaces a corresponding electronic control unit (ECU), the smart key methods are still have significant deficiencies.

Accordingly, structural alternatives are required such that an intruder cannot easily separate and replace an ECU or separate connectors.

While various methods are sought to solve the above-described issue, a technology in which a housing of an ECU for a vehicle is wrapped has been known as described in FIG. 1.

FIG. 1 illustrates an example in which circumferences of a case 12 and a cover 13 are restricted is used in a conventional ECU 10 to prevent vehicle theft.

That is, an anti-theft bracket 20 is disposed on a housing 11 such that the case 12 and the cover 13 are not separated, and first and second mounting brackets 30 and 40 are coupled to both ends of the anti-theft bracket 20 such that the housing 11 is not separated.

In this case, since shear bolts 50 are coupled to connecting portions of the anti-theft bracket 20 and the first and second mounting brackets 30 and 40, there is a structural problem in that the anti-theft bracket 20 and the first and second mounting brackets 30 and 40 are not easily disassembled. This is because, when the shear bolts 50 are tightened with a predetermined torque or more, bolt heads may be broken and the shear bolts 50 may not be released.

Accordingly, since the conventional ECU 10 has many components and a complicated structure to maintain anti-theft performance, there is a structural problem in that a manufacturing cost is inevitably increased.

The above information disclosed in this Background section is only for enhancement of understanding of the background of the invention and, therefore, it may contain information that does not constitute prior art.

SUMMARY

One or more exemplary embodiments of the present invention is directed to providing an electronic control unit for a vehicle having a snap-fit coupling structure of which a configuration for preventing vehicle theft is relatively simple and a manufacturing cost is low.

One or more exemplary embodiments, the present invention is also directed to providing an electronic control unit for a vehicle capable of preventing vehicle theft using a fixing member having a relatively simple thing structure and also reducing a manufacturing cost.

Additional features of the inventive concepts will be set forth in the description with follows, and in part will be apparent from the description, or may be learned by practice of the inventive concepts.

According to one or more exemplary embodiments of the invention, an electronic control unit for a vehicle includes a base portion of which an upper portion is open, a cover portion covers the upper portion of the base portion and on which a matching connector electrically connected to an electronic element is seated, and a fixing member passes between the base portion and the cover portion and vertically fixedly couples the matching connector, the cover portion, and the base portion.

According to one or more exemplary embodiments, the base portion may include an inner wall disposed at an edge of a body to be spaced apart from an outer wall and a coupling hole may be formed in the inner wall.

According to one or more exemplary embodiments, the cover portion may include a connecting wall in contact with the inner wall, and a connecting port which is disposed adjacent to the connecting wall in a state where an upper portion of the connecting port is open and where a matching connector is seated and the connecting wall may include a slit which vertically passes through the connecting wall and into which the fixing member is inserted.

According to one or more exemplary embodiments, the fixing member may include a clasp which restricts the matching connector, a frame may be formed to extend from the clasp and may pass through the slit, and a fixing protrusion formed to extend from a lower end of the frame and insertion-coupled to the coupling hole.

According to one or more exemplary embodiments, the clasp may have a horizontal width relatively smaller than a horizontal width of the frame and is disposed at a center of an end of the frame.

According to one or more exemplary embodiments, the fixing protrusion may be formed on a partial section of the lower end of the frame and formed to obliquely protrude inward from the frame.

According to one or more exemplary embodiments, the fixing protrusion may include a plurality of fixing protrusions formed on the lower end of the frame, and the number of coupling holes into which the fixing protrusions are insertion-coupled is the same as the number of the fixing protrusions.

According to one or more exemplary embodiments, a thickness of the frame may correspond to a width of the slit.

According to one or more exemplary embodiments, the base portion and the cover portion may be formed to have a chamfer structures.

According to one or more exemplary embodiments of the invention, an electronic control unit for a vehicle includes a base portion in which an inner wall is formed at an edge of a body to be spaced apart from an outer wall, the base portion includes a coupling hole disposed in the inner wall, and of which an upper portion is open, a cover portion covers the upper portion of the base portion and includes a connecting wall in which a slit vertically passing through the connecting wall is formed and which is in contact with the inner wall and a connecting port is disposed adjacent to the connecting wall in a state in which an upper portion of the connecting port is open and in which a matching connector is seated, and a fixing member passes through the slit, is insertion-coupled to the coupling hole, and fixedly couples the matching connector, the cover portion, and the base portion.

According to one or more exemplary embodiments of the invention, an electronic control unit for a vehicle includes a base portion in which an inner wall formed on a body including ledges and an upper portion of the base portion is open, a cover portion which is provided as a structure which covers the upper portion of the base portion and includes a connecting wall including a slit and a connecting port is formed adjacent to the connecting wall and in which a matching connector is seated, and a fixing member passes through the slit in a state in which the matching connector is fixed and in which the ledges are insertion-coupled to the fixing member so that the matching connector, the cover portion, and the base portion are fixedly coupled.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts.

DETAILED DESCRIPTION

Figure 1:
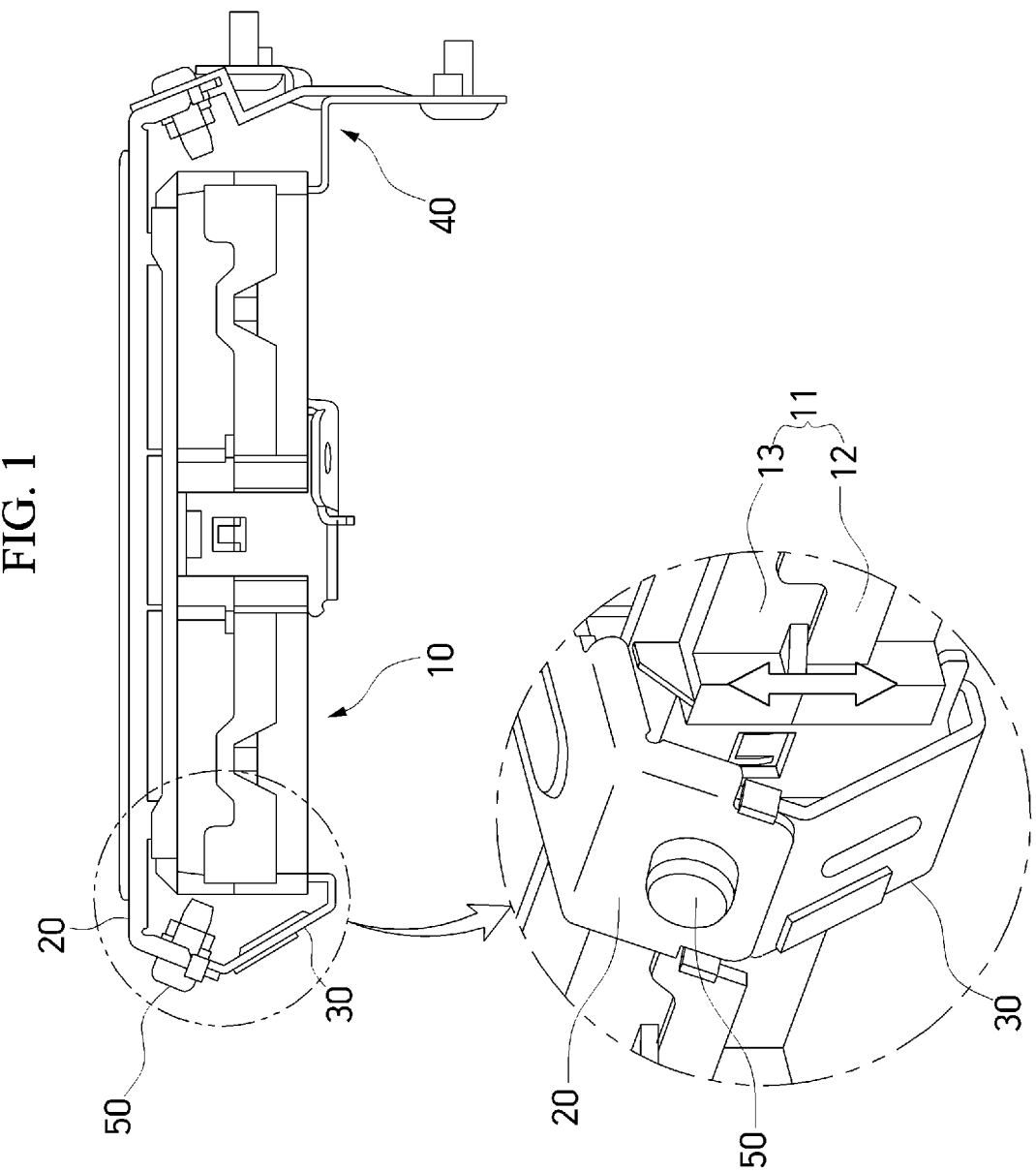
FIG. 1 is a view illustrating an anti-theft bracket assembly structure which fixes a conventional electronic control unit for a vehicle.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In the accompanying figures, the size and relative sizes of layers, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the present invention will be described in detail with reference to accompanying drawings.

Figure 2:
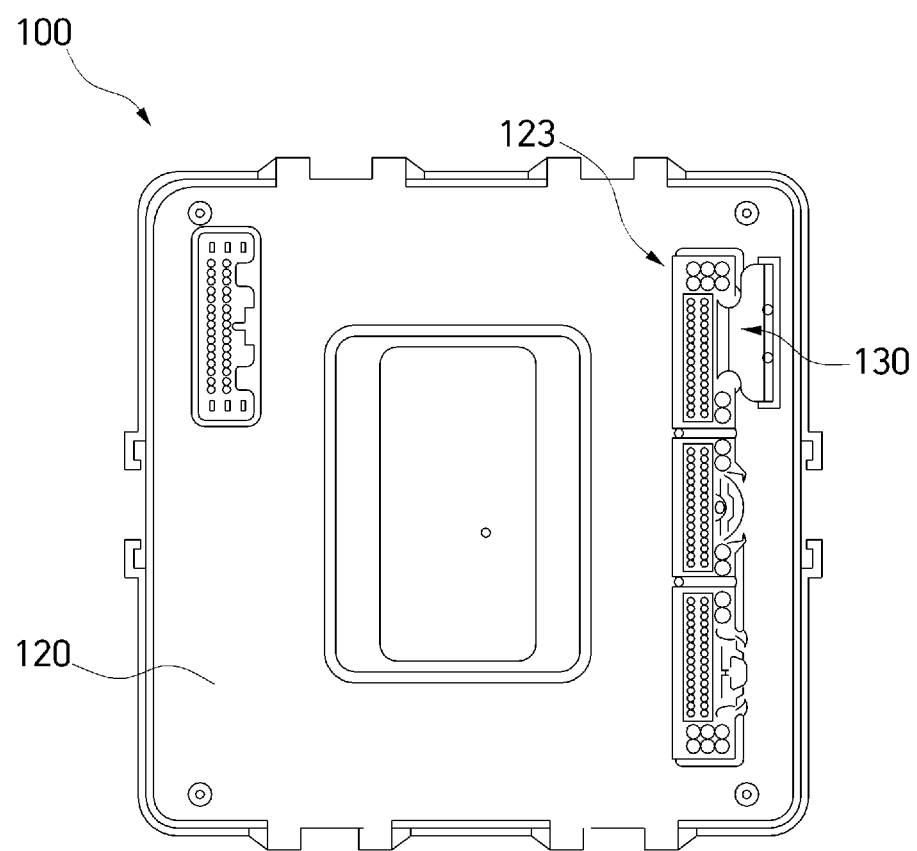
FIG. 2 is a schematic plan view illustrating an electronic control unit for a vehicle according to an embodiment of the inventive concepts.
Figure 3:
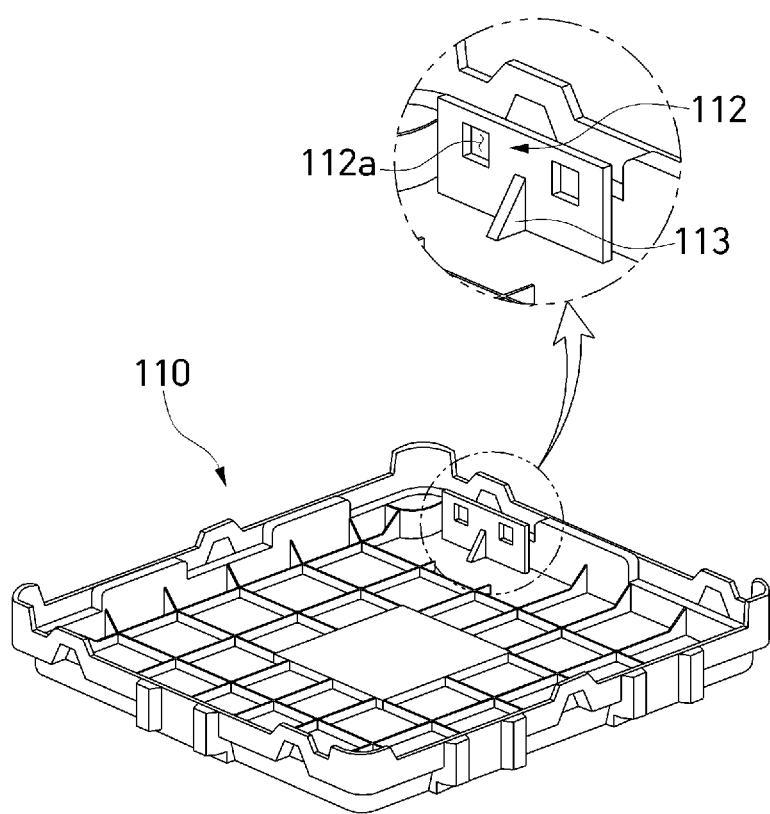
FIG. 3 is a view illustrating a base portion in the electronic control unit for a vehicle according to an embodiment of the inventive concepts.

FIG. 2 is a schematic plan view illustrating an electronic control unit for a vehicle according to a first embodiment of the present invention, and FIG. 3 is a view illustrating a base portion.

In FIGS. 2 and 3, an electronic control unit 100 for a vehicle is a unit configured to control a driver's convenience system.

The electronic control unit 100 for a vehicle mainly includes a base portion 110, a cover portion 120, and a fixing member 130.

First, the base portion 110 and the cover portion 120 are components, which may be separated from each other by a housing (body), and internal components such as electronic elements are embedded in the housing.

In this case, electronic components related to vehicle control are referred to as the electronic elements. In this case, the electronic elements are disposed on a printed circuit board (PCB).

An additional fixing portion (not shown) fixes the PCB and is disposed between the base portion 110 and the cover portion 120. The fixing portion is formed to have a structure which allows the PCB to be detachable from the base portion 110 and the cover portion 120.

As illustrated in FIG. 2, a matching connector 123 is seated on the cover portion 120. The matching connector 123 is matched with and electrically connected to the electronic components.

The fixing member 130 is inserted into and coupled to a partial section of an edge of the cover portion 120. The fixing member 130 is provided to have a snap-fit coupling structure, which is coupled to coupling holes 112a formed in an inner wall 112 of the base portion 110 illustrated in FIG. 3. In this case, the inner wall 112 is disposed within a partial section of the base portion 110 and positioned on a path through which the fixing member 130 of FIG. 2 is inserted.

The inner wall 112 includes a reinforcement rib 113 serving as a reinforcing component to firmly maintain a shape of the inner wall 112. The reinforcement rib 113 is disposed between and connected to the inner wall 112 and a bottom surface of the base portion 110.

Figure 4:
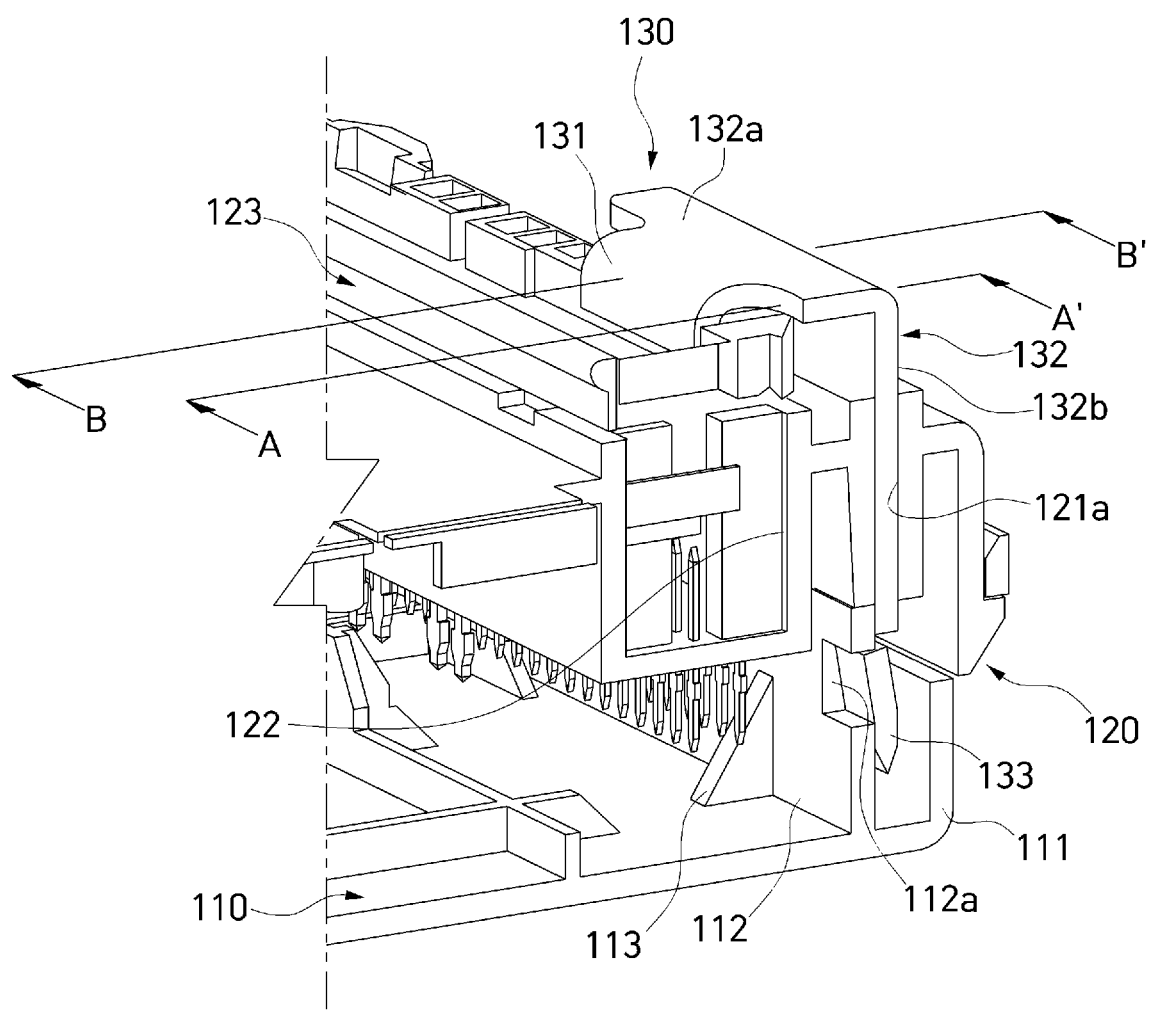
FIG. 4 is a view illustrating coupling relationships between components of the electronic control unit for a vehicle according to an embodiment of the inventive concepts.

FIG. 4 is a view illustrating coupling relationships between components of the electronic control unit for a vehicle according to the first embodiment of the present invention.

In FIG. 4, the electronic control unit 100 for a vehicle includes the base portion 110, the cover portion 120, and the fixing member 130.

The base portion 110 has an open upper portion. The base portion 110 includes the inner wall 112 which is disposed on an edge of the body and spaced apart from an outer wall 111. The coupling holes 112a are formed in the inner wall 112.

The base portion 110 is formed to have a chamfer structure of which an external corner is cut to protect internal components from external impacts.

The cover portion 120 is formed to have a structure which covers the upper portion of the base portion 110. The cover portion 120 may be formed to have the same chamfer structure as the base portion 110 due to the same reason as the base portion 110.

The cover portion 120 includes a connecting wall 121 and a connecting port 122.

The connecting wall 121 is formed on a portion in contact with the inner wall 112 of the base portion 110. The connecting wall 121 includes a slit 121a vertically passing through the connecting wall 121.

The connecting port 122 is disposed adjacent to the connecting wall 121 in a state in which an upper portion thereof is open. The matching connector 123 is seated on the connecting port 122. In this case, the connecting port 122 and the matching connector 123 are coupled in concave-convex manner.

The fixing member 130 passes between the base portion 110 and the cover portion 120 to vertically fixedly couple the matching connector 123, the cover portion 120, and the base portion 110.

The fixing member 130 includes a clasp 131, a frame 132, and a fixing protrusion 133. The fixing member 130 including the clasp 131, the frame 132, and the fixing protrusion 133 is formed as an integrated type.

The clasp 131 is formed to have a bent "⌐" shape to surround and restrict an upper portion of the matching connector 123.

The frame 132 is formed to have a "⌐" shape extending from the clasp 131. The frame 132 includes a horizontal frame 132a and a vertical frame 132b.

The horizontal frame 132a is formed to extend from the clasp 131 in a horizontal direction.

A width of the horizontal frame 132a is relatively greater than a horizontal width of the clasp 131. The clasp 131 is positioned at a center of an end of the horizontal frame 132a.

The vertical frame 132b is formed to extend perpendicular to the horizontal frame 132a. The vertical frame 132b passes through the slit 121a provided in the connecting wall 121.

The fixing protrusion 133 is formed to extend from a lower end of the vertical frame 132b. The fixing protrusion 133 is inserted into and coupled to the coupling hole 112a of the inner wall 112.

In this case, the fixing protrusion 133 is formed to obliquely protrude inward from the vertical frame 132b.

The fixing protrusion 133 may also be formed as a plurality of fixing protrusions 133 on the lower end of the vertical frame 132b. In this case, the number of the coupling holes 112a into which the fixing protrusions 133 are inserted may be the same as the number of the fixing protrusions 133.

Figure 5:
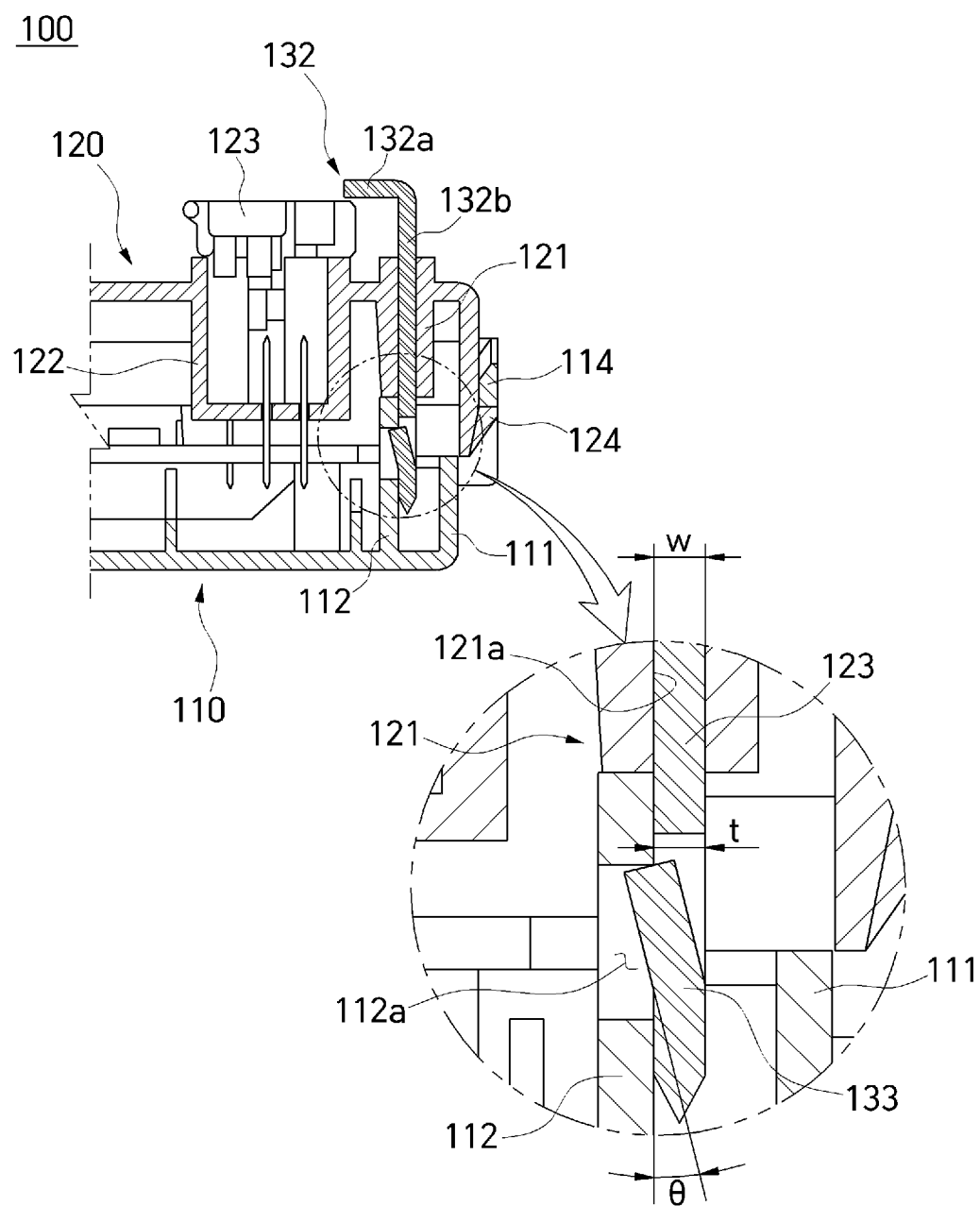
FIG. 5 is a cross-sectional view taken along line A-A' of FIG. 4.
Figure 6:
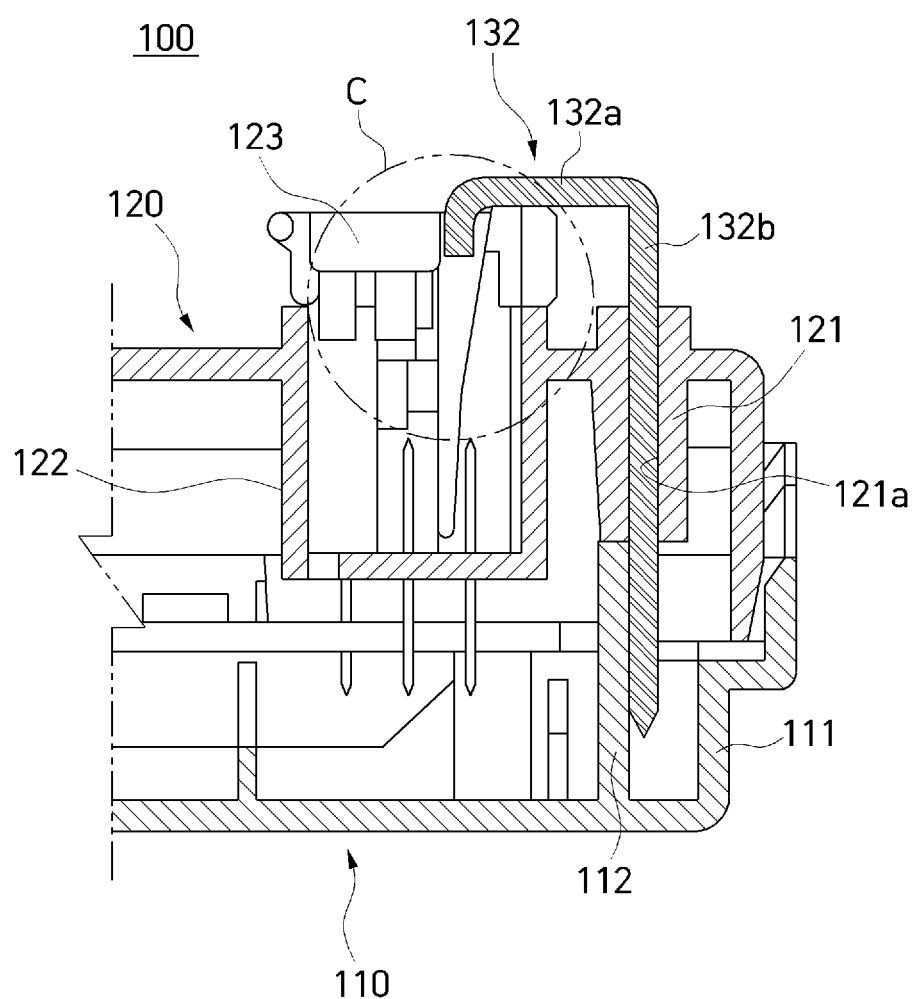
FIG. 6 is a cross-sectional view taken along line B-B' of FIG. 4.
Figure 7:
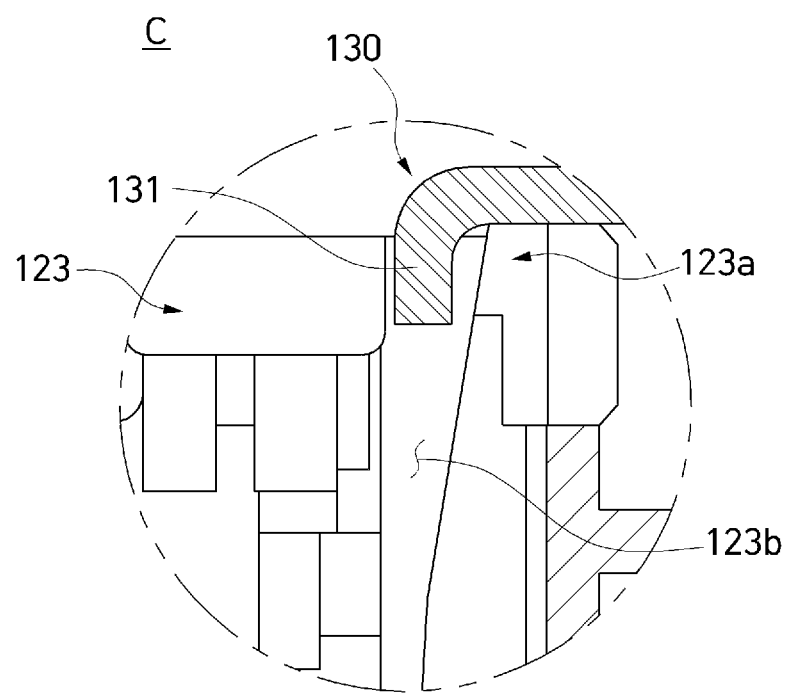
FIG. 7 is an enlarged view illustrating a region C of FIG. 6.

FIG. 5 is a cross-sectional view taken along line A-A' of FIG. 4. FIG. 6 is a cross-sectional view taken along line B-B' of FIG. 4. FIG. 7 is an enlarged view illustrating a region C of FIG. 6.

When descriptions are given with reference to FIGS. 5, 6, and 7, the repeated contents described with reference to FIGS. 2, 3, and 4 will be omitted. However, the contents even described above will be repeated or supplemented according to importance thereof.

In FIG. 5, the fixing protrusion 133 is forcibly inserted into the coupling hole 112a. In this case, a shape of the fixing protrusion 133 is changed to a linear shape, when the fixing protrusion 133 is passing through the slit 121a and is elastically restored as soon as the fixing protrusion 133 completely passes through the slit 121a, so that the fixing protrusion 133 protrudes inward. In this case, the fixing protrusion 133 has a predetermined inclination angle θ. The inclination angle θ may be an acute angle.

Meanwhile, for the fixing member 130 to firmly vertically fix the matching connector 123, the cover portion 120, and the base portion 110 no gap should be generated between the slit 121a and the vertical frame 132b.

Accordingly, a thickness t of the vertical frame 132b may correspond to a width w of the slit 121a.

Accordingly, the outer wall 111 of the base portion 110 may fixedly surround an outer end portion of the cover portion 120.

In this case, an outer hook 124 is provided on the outer end portion of the cover portion 120. The outer hook 124 is insertion-coupled to an outer locking protrusion 114 provided on the outer wall 111 of the base portion 110.

In FIGS. 6 and 7, the matching connector 123 includes a support 123a and a seating groove 123b.

The support 123a is in surface contact with a lower end of the horizontal frame 132a. The support 123a supports the horizontal frame 132a.

The seating groove 123b is a section into which the clasp 131 having the " ⌐ " shape is inserted. The seating groove 123b has a width which is relatively greater than a width of the end portion of the clasp 131.

Figure 8:
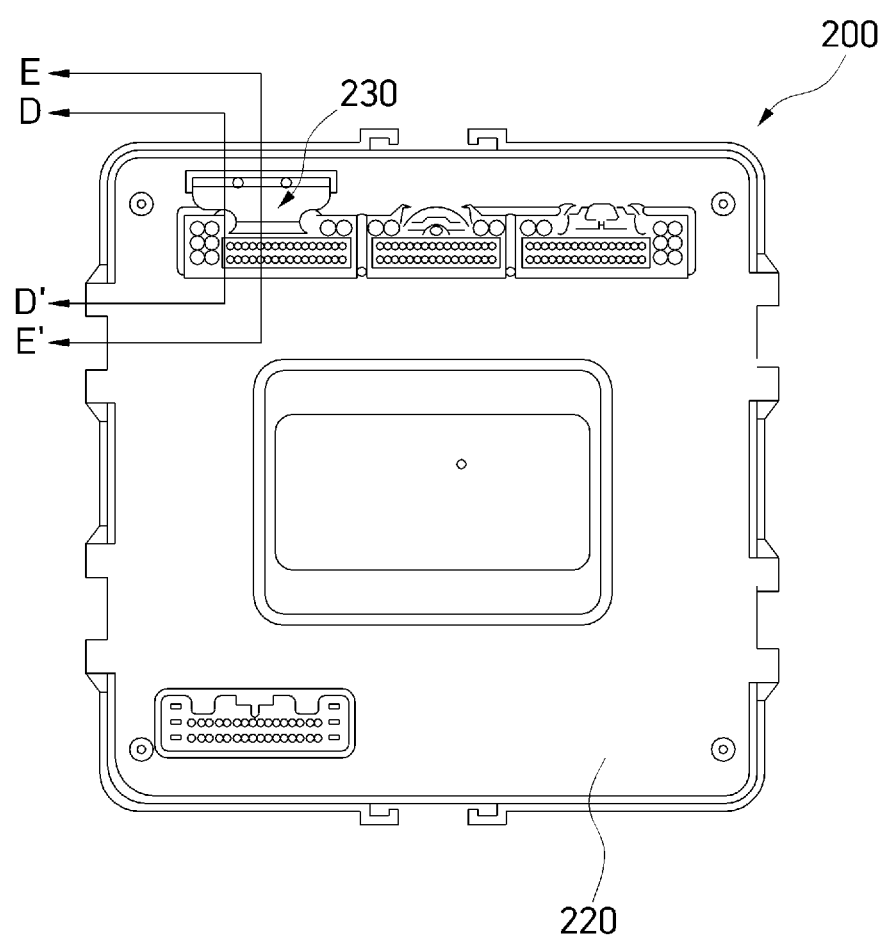
FIG. 8 is a schematic plan view illustrating an electronic control unit for a vehicle according to an embodiment of the inventive concepts.
Figure 9:
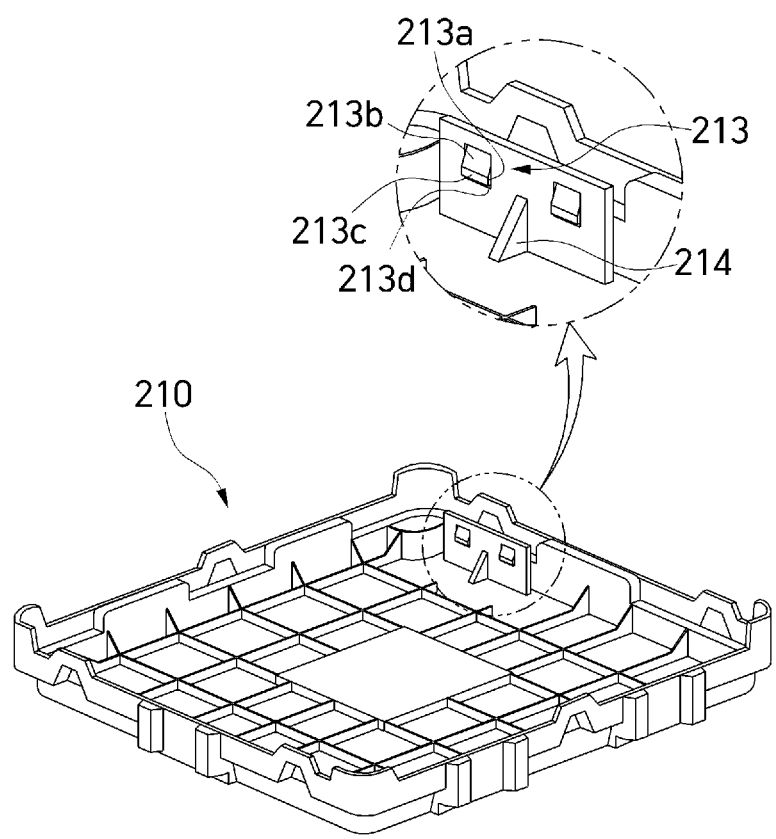
FIGS. 9 and 10 are views illustrating a base portion in the electronic control unit for a vehicle according to an embodiment of the inventive concepts.

FIG. 8 is a schematic plan view illustrating an electronic control unit for a vehicle according to a second embodiment of the present invention, and FIG. 9 is a view illustrating a base portion.

In FIGS. 8 and 9, an electronic control unit 200 for a vehicle according to the second embodiment mainly includes a base portion 210, a cover portion 220, and a fixing member 230.

An additional fixing portion (not shown) which fixes a PCB is disposed between the base portion 210 and the cover portion 220. The fixing portion is provided on an inner surface of the base portion 210 or cover portion 220 and formed as a structure capable of gripping both ends of the PCB.

That is, the fixing portion has the structure having a " ⊏ " shape of which one surface is open to vertically grip both ends of the PCB.

Accordingly, the fixing portion is provided as the structure such that both ends of the PCB slide therein and are fixed when the PCB is inserted between the base portion 210 and the cover portion 220. In other words, the fixing portion has the structure to grip the PCB which is detachable from the base portion 210 and the cover portion 220.

The fixing member 230 is inserted into and coupled to a partial section of an edge of the cover portion 220.

Figure 10:
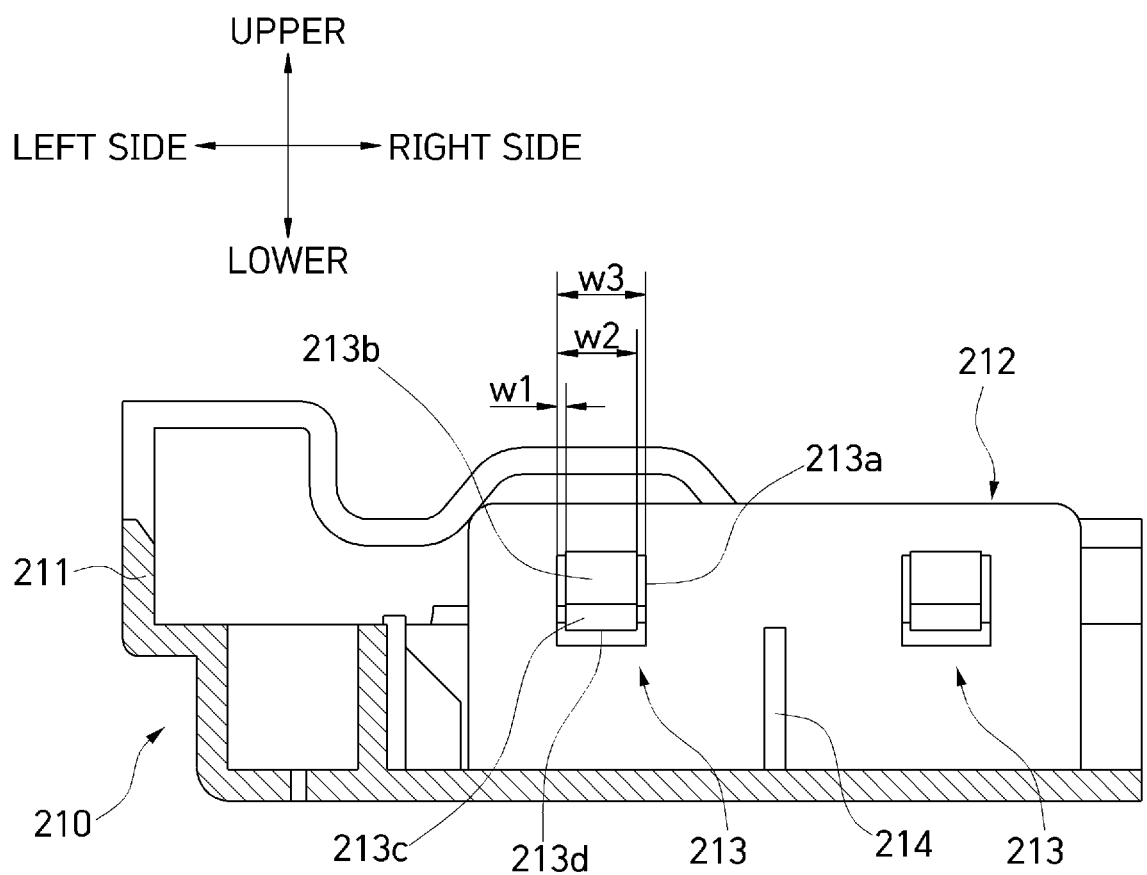

The fixing member 230 having a simple thing structure has a snap-fit coupling structure which is coupled to ledges 213 formed on an inner wall 212 of the base portion 210 illustrated in FIG. 10.

In this case, the ledge 213 is formed to have an inclined shape along which a width of the ledge 213 is increased in a downward direction. In this case, the ledge 213 includes a base plate 213a, an inclined surface 213b, a horizontal surface 213c, and a vertical surface 213d.

The base plate 213a in a flat state protrudes from the inner wall 212.

The inclined surface 213b is formed to have a shape protruding from the base plate 213a and has a structure inclined from an upper end to one section of a lower end of the base plate 213a. That is, the inclined surface 213b is a section inclined downward from an upper portion of the inclined surface 213b.

The horizontal surface 213c is a horizontal section formed to extend from the inclined surface 213b and is parallel to the base plate 213a.

The vertical surface 213d is a vertical section formed to extend perpendicular to the horizontal surface 213c. In this case, one end of the vertical surface 213d is connected to the horizontal surface 213c, and the other end of the vertical surface 213d is connected to the base plate 213a.

The base portion 210 and the cover portion 220 are formed of a synthetic material such as plastic through an injection molding process. Accordingly, the base portion 210 and the cover portion 220 can effectively use elastic forces thereof due to a snap-fit structure through which the base portion 210 and the cover portion 220 are coupled.

Figure 11:
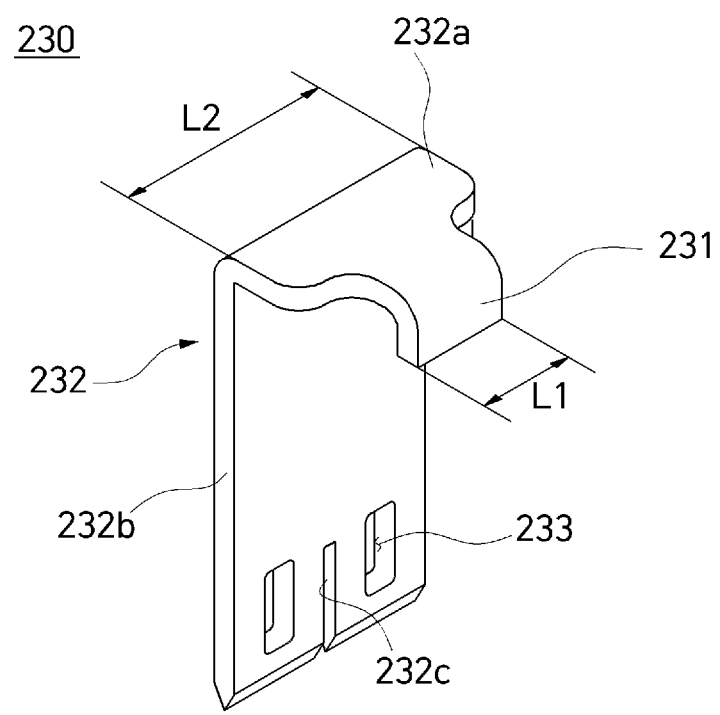
FIG. 11 is a view illustrating a fixing member in the electronic control unit for a vehicle according to an embodiment of the inventive concepts.

FIG. 10 is a view illustrating the base portion in the electronic control unit for a vehicle according to the second embodiment of the present invention, and FIG. 11 is a view illustrating the fixing member.

In FIGS. 10 and 11, when the fixing member 230 passes through a slit 221a (of FIG. 12) and the ledges 213 are insertion-coupled to the fixing member 230, the ledges 213 are inserted into coupling holes 233 of the fixing member 230.

In this case, in order to insert the ledge 213 into the coupling hole 233, it is advantageous that a width of the ledge 213 be relatively slightly smaller than a width of the coupling hole 233. Accordingly, the ledge 213 can be smoothly inserted into the coupling hole 233 and generation of a gap between the coupling portions can be prevented.

According to the above-described purpose, a lateral width w2−w1 of the inclined surface 213b, the horizontal surface 213c, and the vertical surface 213d may be relatively smaller than a lateral width w3 of the base plate 213a, and the inclined surface 213b, the horizontal surface 213c, the vertical surface 213d, and the base plate 213a are included in the ledge 213.

In this case, the width w1 may be 0.5 mm, the width w2 may be 4.5 mm, and the width w3 may be 5.0 mm.

The fixing member 230 includes a clasp 231, a frame 232, and the coupling holes 233 as an integrated type with a simple structure.

As illustrated in FIG. 11, the clasp 231 has a " ⌐ " shape. That is, the clasp 231 is formed to have a hook shape capable of restricting a portion which is a portion to be fixed (a matching connector 223 of FIG. 12) in horizontal and vertical directions.

The frame 232 is formed to extend from a "-" shaped end portion of the clasp 231. The frame 232 has a "┓" shape. The frame 232 includes a horizontal frame 232a and a vertical frame 232b.

The horizontal frame 232a is formed to extend from the "-" shaped end portion of the clasp 231 having a "┌" shape and has a "-" shape which is a horizontal structure.

In this case, a horizontal width L2 of the horizontal frame 232a is relatively greater than a horizontal width L1 of the clasp 231. In this case, the clasp 231 is positioned at a center of an end of the horizontal frame 232a.

The vertical frame 232b is formed to extend perpendicular to the horizontal frame 232a and has a "l" shape which is a vertical structure.

The coupling holes 233 are formed in a lower end of the vertical frame 232b. The coupling holes 233 are formed with an interval in the lower end of the vertical frame 232b. In this case, the vertical frame 232b includes a rib groove 232c disposed between the plurality of coupling holes 233.

The rib groove 232c is a valley portion vertically formed at a center of a lower end portion of the vertical frame 232b. A reinforcement rib 214 illustrated in FIG. 10 is inserted into the rib groove 232c. Accordingly, a width of the rib groove 232c may correspond to a width of the reinforcement rib 214.

Figure 12:
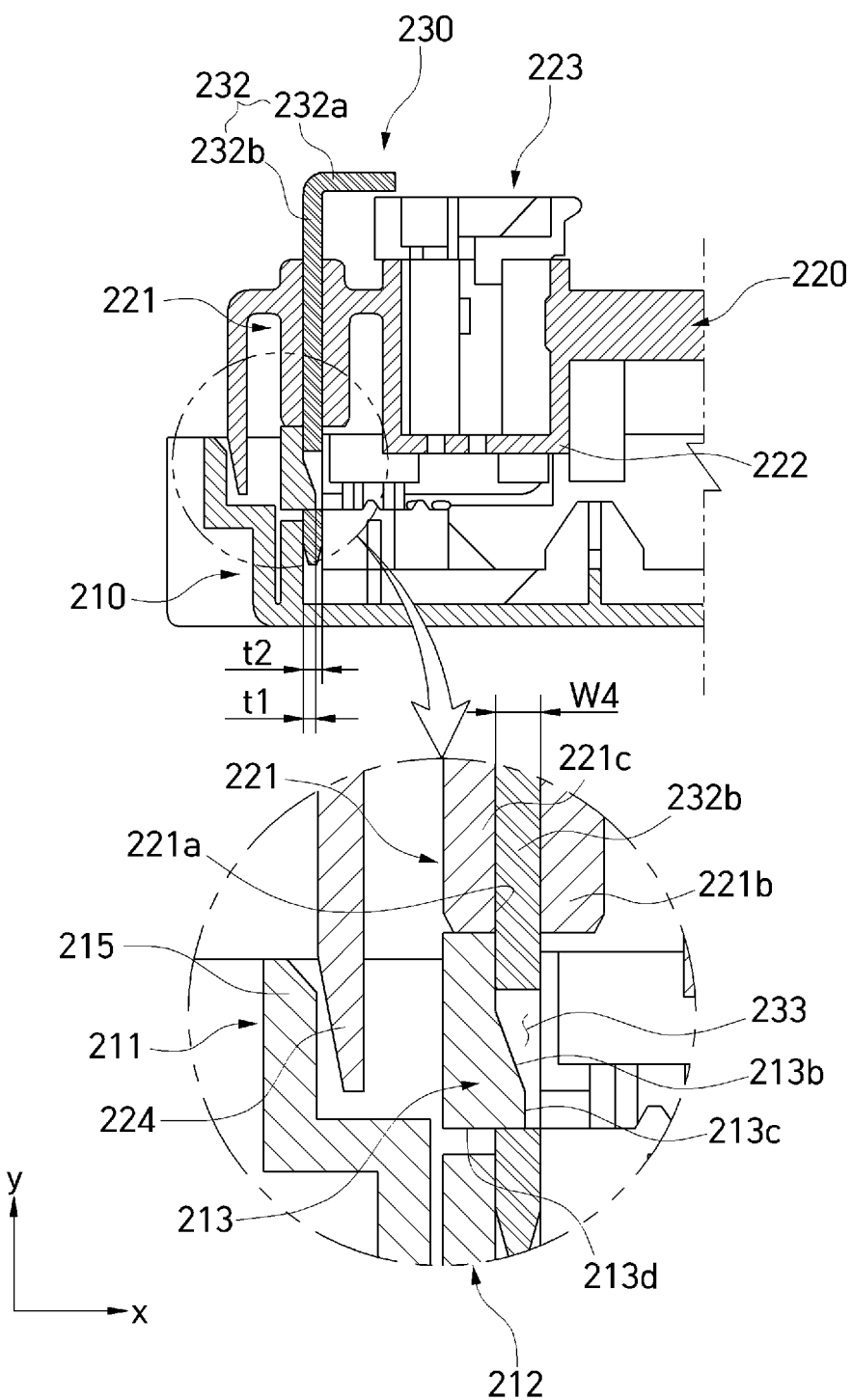
FIG. 12 is a cross-sectional view taken along line D-D' of FIG. 8.
Figure 13:
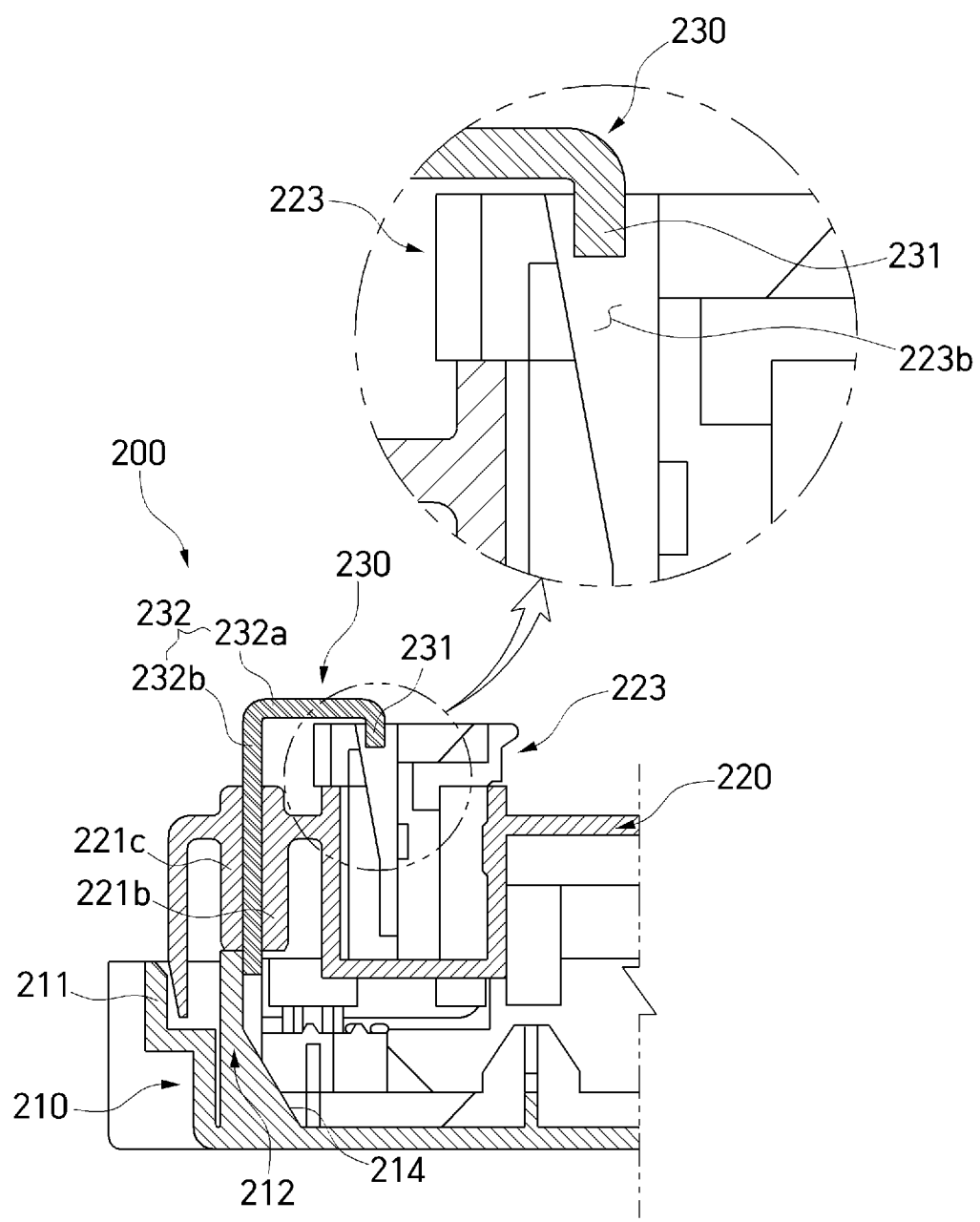
FIG. 13 is a cross-sectional view taken along line E-E' of FIG. 8.

FIG. 12 is a cross-sectional view taken along line D-D' of FIG. 8, and FIG. 13 is a cross-sectional view taken along line E-E' of FIG. 8.

When descriptions are given with reference to FIGS. 12 and 13, the repeated contents described with reference to FIGS. 8 to 11 will be omitted. However, the contents even described above will be repeated or supplemented according to importance thereof.

In FIGS. 12 and 13, the base portion 210 has a structure in which an upper portion is open. The base portion 210 includes an inner wall 212 which is disposed on an edge of a body to be spaced apart from an outer wall 211. The ledge 213 is formed on the inner wall 212.

The ledge 213 is inserted into the coupling hole 233 formed in the fixing member 230. In this case, at least a half of the ledge 213 may overlap the coupling hole 233.

Due to structural features of the ledge 213, a thickness t1 of the ledge 213 is bound to be limited. That is, in order to insert the ledge 213 into the coupling hole 233 after the vertical frame 232b is inserted into the slit 221a, the thickness t1 (for example, 1 mm) of the ledge 213 cannot be greater than a thickness t2 (for example 1.6 mm) of the vertical frame 232b.

Otherwise, when the thickness t1 of the ledge 213 is significantly less than (at least a half of) the thickness t2 of the vertical frame 232b, an intruder who intends to steal a vehicle may insert a separate part into the slit 121a and easily separate a housing.

The intruder having a bad intention tries to separate the housing without damage or to separate the connector in order to steal a vehicle.

In this case, when an intruder inserts a part having a thin end into a slit 221a in a y-axis direction and turns the part in an x-axis direction using a lever principle, a fixing (coupling) structure of a conventional housing was easily separable.

However, since at least the half of the ledge 213 inserted into the coupling hole 233 and overlaps the coupling hole 233 in the electronic control unit 200 for a vehicle according to the second embodiment, the intruder may not easily separate the housing or separate the connector.

Due to the snap-fit structure, it is difficult for the intruder to insert the part thereinto, and even when the intruder inserts the part thereinto, it is difficult for the intruder to easily separate the housing.

The cover portion 220 includes a connecting wall 221 and a connecting port 222.

The connecting wall 221 is formed at a portion in contact with the inner wall 212 of the base portion 210. The connecting wall 221 includes the slit 221a vertically passing through the connecting wall 221.

The connecting wall 221 includes "⊏" shaped outer sleeves 221b and 221c with the slit 221a disposed between the outer sleeves. In this case, a lower end portion of the outer sleeve 121c is in contact with the inner wall 212. In this case, the outer sleeve 221c and the inner wall 212 may also be fixed to each other due to a snap-fit structure.

The connecting port 222 is disposed adjacent to the connecting wall 221 in a state in which an upper portion of the connecting port 222 is open. The matching connector 223 is seated on the connecting port 222. In this case, the connecting port 222 and the matching connector 223 have a snap-fit structure and are connected in concave-convex manner.

The fixing member 230 passes between the base portion 210 and the cover portion 220 and vertically fixedly couples the matching connector 223, the cover portion 220, and the base portion 210.

In order for the fixing member 230 to firmly vertically fix the matching connector 223, the cover portion 220, and the base portion 210, no gap should be generated between the slit 221a and the vertical frame 232b.

Accordingly, the thickness t2 of the vertical frame 232b may correspond to a width w4 of the slit 221a.

Therefore, the outer wall 211 of the base portion 210 may fixedly surround an outer end portion of the cover portion 220.

In this case, an outer hook 224 is provided on the outer end portion of the cover portion 220. The outer hook 224 is insertion-coupled to an outer locking protrusion 215 provided on the outer wall 211 of the base portion 210.

According to one embodiment of the present invention, an electronic control unit for a vehicle has a snap-fit coupling structure of which a fixing member including a clasp and a fixing protrusion, which have a relatively simple structure, fixes a housing (a base portion and a cover portion) and a matching connector together.

Accordingly, the present invention provides an effect in that anti-car theft performance is maintained using a relatively simple structure and a manufacturing cost is also reduced.

According to another embodiment of the present invention, an electronic control unit for a vehicle can increase a coupling force using a fixing member capable of fixing both of a base portion and a cover portion on which a matching connector is seated.

In this case, since the fixing member and the base portion are formed to have a snap-fit coupling structure, even when an intruder inserts a separate part to steal a vehicle, the connector or the housing can be prevented from being separated as long as the housing is not broken.

In other words, when a fixing protrusion formed in an inner wall of the base portion is inserted into a coupling hole of the fixing member, since at least a half of the fixing protrusion overlaps the coupling hole, the housing is effectively prevented from being separated.

Accordingly, the electronic control unit for a vehicle provides an effect in which anti-vehicle theft performance is maintained and a manufacturing cost is also reduced by using the fixing member having a relatively simple thing structure.

In addition, in the electronic control unit for a vehicle, since the fixing member passes through a slit and is coupled to the fixing protrusion in a state in which the fixing member having the simple thing structure fixes the matching connector, an assembly workability can be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic control unit for a vehicle, comprising:
   a base portion of which an upper portion is open and in which an inner wall is formed at an edge of a body to be spaced from an outer wall;
   a cover portion configured to cover the upper portion of the base portion and on which a matching connector electrically connected to an electronic element is seated; and
   a fixing member passing between the base portion and the cover portion and vertically fixedly coupling the matching connector, the cover portion, and the base portion,
   wherein the fixing member includes:
      a clasp restricting the matching connector;
      a frame formed to extend from the clasp; and
      a fixing protrusion formed to extend from a lower end of the frame,
      wherein the fixing protrusion is formed on a partial section of the lower end of the frame and formed to obliquely protrude inward from the frame such that a distal end of the fixing protrusion extends further away from the inner wall of the base portion than a proximal end of the fixing protrusion, and
      wherein the distal end of the fixing protrusion has a tapered shape that forms a pointed, V-shaped structure.

2. The electronic control unit of claim 1, wherein:
   a coupling hole is formed into which the fixing protrusion is insertion-coupled in the inner wall.

3. The electronic control unit of claim 1, wherein:
   the cover portion includes a connecting wall in contact with the inner wall of the base portion, and a connecting port disposed adjacent to the connecting wall in a state in which an upper portion of the connecting port is open and in which the matching connector is seated; and
   the connecting wall includes a slit which vertically passes through the connecting wall and into which the fixing member is inserted.

4. The electronic control unit of claim 1, wherein the clasp has a horizontal width relatively smaller than a horizontal width of the frame and is disposed at a center of an end of the frame.

5. The electronic control unit of claim 2, wherein:
   the fixing protrusion is provided as a plurality of fixing protrusions formed on the lower end of the frame; and
   an amount of coupling holes into which the fixing protrusions are insertion-coupled is equal to an amount of the fixing protrusions.

6. The electronic control unit of claim 3, wherein a thickness of the frame corresponds to a width of the slit.

7. An electronic control unit for a vehicle, comprising:
   a base portion in which an inner wall is formed at an edge of a body to be spaced apart from an outer wall, the base portion includes a coupling hole disposed in the inner wall, and of which an upper portion is open;
   a cover portion covering the upper portion of the base portion and including a connecting wall in which a slit vertically passing through the connecting wall is formed and which is in contact with the inner wall and a connecting port is disposed adjacent to the connecting wall in a state in which an upper portion of the connecting port is open and in which a matching connector is seated; and
   a fixing member that includes a fixing protrusion passing through the slit, insertion-coupled to the coupling hole, and the fixing member fixedly coupling the matching connector, the cover portion, and the base portion,
   wherein the fixing protrusion is formed on a partial section of the lower end of the fixing member and formed to obliquely protrude inward from the fixing member such that a distal end of the fixing protrusion extends further away an interior region of the base portion than a proximal end of the fixing protrusion, and
   wherein the distal end of the fixing protrusion has a tapered shape that forms a pointed, V-shaped structure.

8. The electronic control unit of claim 7, wherein the fixing member includes:
   a clasp surrounding an upper portion of the matching connector; and
   a frame including a horizontal frame formed to horizontally extend from the clasp and a vertical frame formed to extend perpendicular to the horizontal frame and passing through the slit.

9. The electronic control unit of claim 8, wherein the fixing protrusion is formed on a partial section of the lower end of the vertical frame and obliquely protrudes inward from the vertical frame.

10. The electronic control unit of claim 8, wherein the matching connector includes:
    a support in contact with the horizontal frame of the fixing member; and
    a seating groove into which the clasp of the fixing member is inserted.

11. The electronic control unit of claim 1, wherein the outer wall of the base portion fixedly surrounds an outer end portion of the cover portion when the fixing member is situated to vertically fixedly couple the matching connector, the cover portion, and the base portion.

12. The electronic control unit of claim 11, further comprising:
    an outer hook provided on the outer end portion of the cover portion; and
    an outer locking protrusion provided on the outer wall of the base portion,
    wherein the outer hook is insertion-coupled to the outer locking protrusion.

13. The electronic control unit of claim 10, wherein the support is in contact with a lower end of the horizontal frame so as to support the horizontal frame, and
    wherein the seating groove has a width which is relatively greater than a width of an end portion of the clasp.

* * * * *